Oct. 30, 1951 T. F. HANNIGAN 2,573,328

PHONOGRAPH TONE-ARM ACTUATOR

Filed Oct. 16, 1948

INVENTOR.

Thomas F. Hannigan.

BY Ross & Ross

Attys

Patented Oct. 30, 1951 2,573,328

UNITED STATES PATENT OFFICE 2,573,328

PHONOGRAPH TONE-ARM ACTUATOR

Thomas F. Hannigan, Springfield, Mass.

Application October 16, 1948, Serial No. 54,929

2 Claims. (Cl. 274—42)

Figure 1:
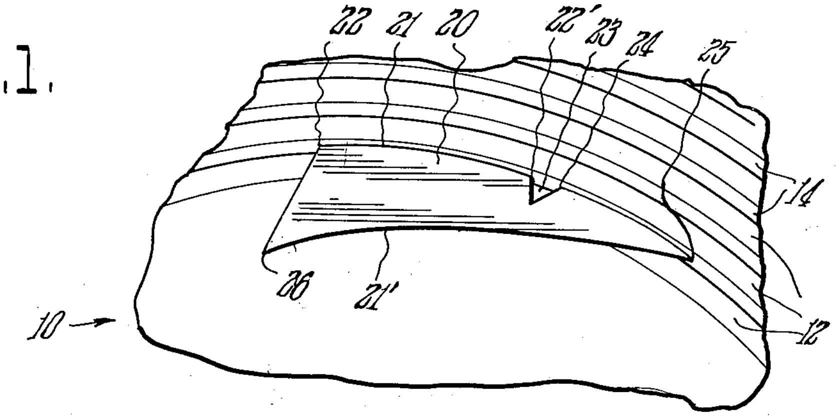

My invention relates to improvements in a phonograph tone arm actuator and is directed more particularly to the provision of a device which may be attached to or which may be made an integral part of a phonograph record for the purpose of providing an actuating means whereby a tone arm may be shifted upon termination of a recording.

It is the principal object of my invention to provide a novel and improved construction of the type by means of which a tone arm is automatically shifted, upon completion of a recording, so as to return the tone arm to its normal resting position adjacent the outer edge of the record in the well known manner.

The existing practice in the trade is to provide a spiral groove in the face of the record, the same being merely a continuation of the groove cut into the record and by means of which sounds are obtained therefrom. This spiral groove is of such configuration as to lead the tone arm further and abruptly inwardly toward the center of the record upon completion of the recording thereof; it being understood of course that this spiral groove is nothing more than a continuation of the recording groove in the record.

As is well known, the tone arm is guided by virtue of the fact that the needle associated therewith follows a path in the groove and is thus controlled by the record as it rotates. Upon completion of the recording, the groove is continued in its ever decreasing concentric circles along the aforesaid spiral groove whereby the needle and the tone arm associated therewith are more or less abruptly urged inwardly toward the center of the record. As is well known, in modern phonographs, the tone arm is mechanically operated so that when it reaches a certain extreme point in its swinging arc, it is mechanically lifted upwardly from its operational position above the record surface, is shifted laterally, and is returned to its position of rest away from and adjacent the record at the outer edge thereof.

The continuation of the groove in present day records is adapted to take advantage of the above described mechanical feature of the tone arms of present day machines. However, in a record of earlier type, the spiralled continuation of the groove was not provided inasmuch as the phonograph tone arm was not so mechanically or automatically operated, they being manually operable, as is well known. It is also true that even in the case of certain modern records, same will not operate so as to permit an automatic action of the tone arm; thus making the device of my invention all the more desirable.

Accordingly, and because of the tremendous interest among present day music lovers in records of the above referred to objectionable types, I have devised a novel means whereby the objection that the old type records cannot be played on the present-day automatic record players with the same degree of ease and efficiency is overcome.

I accomplish this by the provision of a device which substitutes for the spiralled continuation of the groove that is found in present day records and achieves an identical result whereby old type records may be played on the present day automatic record players and may enjoy all of the automatic features and benefits thereof.

It is a still further object to provide a device which is constructed of relatively simple parts and which is adapted to be readily assembled and placed in operational use by even the most inexpert of layman.

It is another object to provide a device which when once assembled is positively and securely retained in operative relationship and which is not likely to be readily separated from the record with which it is associated, either accidentally or otherwise.

Other prime objects of my invention include: first, the provision of a simplified construction of an actuating device which is strong, durable and compact in its structure and distinctive in its appearance; second, the securement of a higher degree of accuracy and a greater degree of ease in the manner of work performed therewith than has heretofore been possible with manual operations as have up to now been made necessary; third, the attainment of a high degree of speed of construction and assembly of the device due to its simplification in design and its unique composition of parts; fourth, the provision of an improved device which may be made more economically and with fewer operations in the manufacture thereof than any prior devices known to the art.

These objects I accomplish by means of such structure and relative arrangement of parts thereof, as will fully appear by a perusal of the following description and by various features which will hereinafter be set forth.

Figure 2:
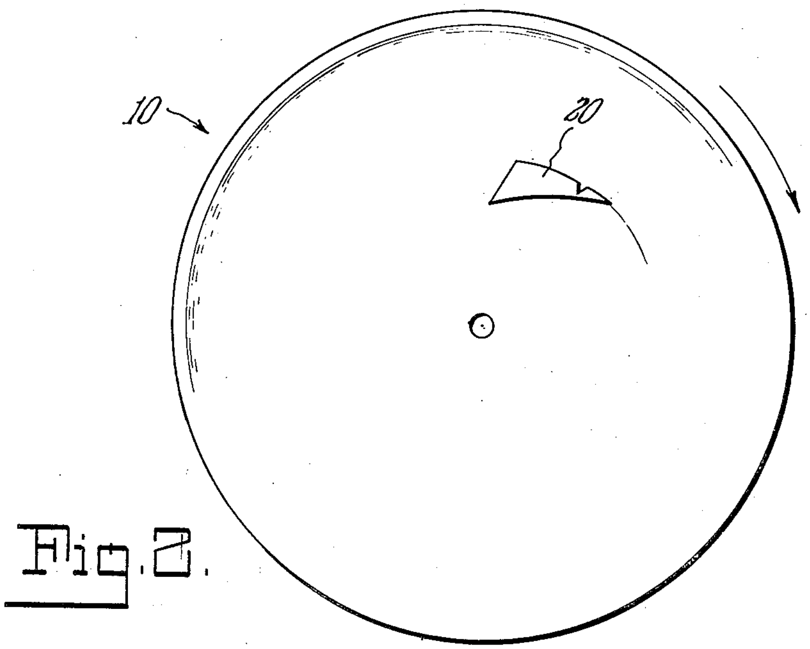

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is an enlarged plan view of the device of my invention in association with a portion of a phonograph record, Fig. 2 is a plan view of the device of my invention in association with a phonograph record, said record being shown in full view on a reduced scale.

In the above mentioned drawings annexed hereto and forming a part of this specification, I have shown but one embodiment of my invention which is deemed preferable, but it is to be understood that changes and modifications may be made within the scope of the appended claims without departing from the spirit of the invention.

Referring now to the different drawings more in detail, in which similar characters of reference indicate corresponding parts in all the figures and referring more particularly to the preferred form of my invention selected for illustrative purposes, I have shown a phonograph record which is generally designated by the numeral 10.

The record 10 has the conventional concentric grooves or valleys 12 separated by the conventional lines or ridges or hills 14. As shown in Fig. 1, and merely for purposes of distinguishment, the hills or lines are shown to be of less width than the valleys.

A tone arm needle rides in the valleys as the record is rotated, all as is well known.

An actuator member 20 is provided and this may be made of metal, plastic, or other suitable material. It is a relatively thin member and is generally dart-like in shape.

That is to say, the member 20 has opposite faces or edges thereof arranged in a substantially diverging relation toward a point or extremity thereof.

In one form, the member 20 is a separate member and may be secured to a record member 10 as by glue or the like. In another form, the member 20 may be an integral part of the member 10 as will hereinafter be more fully explained.

One side of the member 20 has an outer side or edge 21 which edge is provided with an outer point 22 at one end of the edge of the member 20 and an intermediate point 22' spaced inwardly therefrom, which points may be disposed over a certain ridge or hill 14 of the record when the member 20 is associated with a record.

Generally, the points 22 and 22' will be aligned along the first or most inwardly ridge or hill of the plurality of the same which are to be found on a phonograph record of the type for which my device is intended.

At the opposite end of the member 20 and on the same side or edge as the points 22 and 22' (namely, edge 21), I provide a needle engaging point 25 and an intermediate point 24 spaced inwardly therefrom.

The point 24 like the points 22 and 22' may be disposed over the certain ridge or hill 14 of the record. That is to say, the points 22, 22' and 24 are all on the arc of the same radius. The edge between the points 22 and 24 is in the shape of the arc corresponding to the arc formed by the hills on the record. Thus it will be observed that in securing the member 20 to a record the side or edge 21 of the member 20 between the points 22 and 24 is easily aligned with the certain hill of the record so that the point 22, 22' and 24 are disposed over the said certain ridge.

A cut or inset 23 is provided in the number 20 and extends inwardly from the side edge 21 so as to define more clearly the points 22' and 24 and to serve as a guide in aligning the points upon the certain hill of the record.

The points 24 and 25 are on an arc of a different radius from that above described and for reasons as will presently be observed.

The needle engaging point 25 is likewise adapted to be disposed over a ridge or hill of the record although the ridge need not necessarily be the same ridge as the one on which the points 22, 22' and 24 are aligned.

The only reason for providing the points 22, 22' and 24 along an arc in the first place is to provide a simplified means by which the device may be assembled. Obviously, the important feature is that the point 25 be disposed over a hill or ridge substantially as shown in Fig. 1 and not be disposed over the center of the groove.

The outer edge 21 and the inner edge 21' of the member 20 diverge relatively from the point 25 as shown.

The inner edge 21' is of such configuration that when the needle being guided along the groove reaches the point in the groove where further forward movement thereof is stopped or blocked by the presence of the member 20, the path of the needle from its path of ever decreasing concentric circles is abruptly changed.

The needle is guided along the inner edge 21'.

The member 20 is of such dimension that before the needle reaches the end point 26, the tone arm associated with the needle has been urged inwardly along its swinging arc sufficiently so as to be mechanically lifted and returned to the normal rest position.

As stated above, the member 20 may be formed as an integral part of a record 10. That is to say, in the forming of the member 10, as the same is pressed or otherwise produced, its present method of manufacture may be so changed as to produce a raised portion substantially of the size and configuration of the member 20 and for the purposes as above stated.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. In combination with a phonograph record having a spirally grooved sound track, a device for actuating a swingable tone arm having a needle depending therefrom and extending into the sound track in a direction inwardly and away from the sound track towards the central portion of the record comprising, a member adhesively secured to the record having outer and inner edges converging forwardly to a point with the point disposed adjacent and radially outwardly of the innermost groove of the record, the outer converging edge having a radius coinciding with the radius of the sound track grooves, the inner of the converging edges having an edge in communication with the innermost spiral groove of the record and adapted for guiding the needle abruptly and rapidly inwardly out of its path at the intersection of the innermost groove and the inner edge of said member.

2. A device for engaging the needle in a convolution of a sound groove of a rotating phonograph record and for swinging a tone-arm carrying the needle inwardly of the convolution toward the central portion of the record comprising, a member adhesively secured to the record and having an outer upper edge curved in the arc of a circle and an inner lower edge convexly curved with the upper and lower edges converging and merging into a forward point, the outer upper edge and point being disposed immediately outwardly of the innermost convolution and the inner lower edge extending inwardly from the point across the convolution and rearwardly relative to the direction of rotation of the record whereby the needle engages the inner edge and the tone-arm is swung inwardly of the record.

THOMAS F. HANNIGAN.

REFERENCES CITED

The following references are of record in the file of this patent:

UNITED STATES PATENTS

| Number | Name | Date |
|---|---|---|
| Re. 16,588 | Hadley | Apr. 5, 1927 |
| 855,116 | Miller | May 28, 1907 |
| 1,077,152 | Miller | Oct. 28, 1913 |
| 1,112,406 | Ebeling | Sept. 29, 1914 |
| 1,112,838 | Rogers | Oct. 6, 1914 |
| 1,407,090 | Shaw | Feb. 21, 1922 |
| 2,056,372 | Schwartz | Oct. 6, 1936 |
| 2,243,126 | Routin | May 27, 1941 |
| 2,287,240 | Haltenhof | June 23, 1942 |